United States Patent
Senyek et al.

(10) Patent No.: US 6,369,158 B1
(45) Date of Patent: Apr. 9, 2002

(54) DIBENZYLTRITHIOCARBONATE MOLECULAR WEIGHT REGULATOR FOR EMULSION POLYMERIZATION

(75) Inventors: Michael Leslie Senyek; Joseph John Kulig, both of Tallmadge; Dane Kenton Parker, Massillon, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/470,413

(22) Filed: Dec. 22, 1999

(51) Int. Cl.[7] .......................... C08F 2/40; C08F 263/10; C08F 236/06; C08L 9/08; C08L 25/10
(52) U.S. Cl. .......................... 524/836; 526/65; 526/66; 526/75; 526/87; 526/222; 526/224; 526/340
(58) Field of Search .................................. 524/804, 836; 526/65, 66, 75, 87, 222, 224, 340

(56) References Cited

U.S. PATENT DOCUMENTS 5,583,173 A   12/1996   Gujarathi et al. ............ 524/458

FOREIGN PATENT DOCUMENTS

| WO | WO 98/01478 | | 1/1998 | |
| WO | 98/01478 | * | 1/1998 | ............. C08F/2/38 |

* cited by examiner

*Primary Examiner*—D. R. Wilson
*Assistant Examiner*—Kelechi Egwim

(74) *Attorney, Agent, or Firm*—Alvin T. Rockhill

(57) ABSTRACT

Mercaptans are normally used as chain transfer agents in emulsion polymerizations. The mercaptans used in commercial applications are typically complex mixtures of hundreds of similar compounds having boiling points within a narrow range. The chain transfer activity of different mercaptans with such mixtures can vary substantially. To further complicate the situation, the distribution of various mercaptans can also vary substantially between lots of material obtained from commercial sources. Thus, consistent molecular weight control is typically difficult to attain in free radical emulsion polymerizations. This invention is based upon the unexpected discovery that dibenzyltrithiocarbonate will act as a pure compound to effectively and consistently control molecular weight in free radical emulsion polymerizations. The polydispersity of polymers made using dibenzyltrithiocarbonate as a molecular weight regulator is similar to that obtained using conventional mercaptan systems. This invention more specifically discloses a process for controlling the molecular weight of a polymer synthesized by free radical emulsion polymerization that comprises polymerizing at least one monomer by free radical polymerization in an aqueous emulsion in the presence of dibenzyltrithiocarbonate. For instance, dibenzyltrithiocarbonate can be used as a molecular weight regulator in the synthesis of styrene-butadiene rubber by emulsion polymerization. Accordingly, this invention further discloses a process for synthesizing styrene-butadiene rubber (SBR) that comprises copolymerizing styrene monomer and 1,3-butadiene monomer by free radical polymerization in an aqueous emulsion in the presence of dibenzyltrithiocarbonate. The use of dibenzyltrithiocarbonate is inherently less odorous than the use of mercaptans.

19 Claims, No Drawings

DIBENZYLTRITHIOCARBONATE MOLECULAR WEIGHT REGULATOR FOR EMULSION POLYMERIZATION

BACKGROUND OF THE INVENTION

Emulsion polymerization is used commercially to synthesize a wide variety of polymers. It is frequently desirable to reduce the molecular weight of such polymers. This is typically accomplished by conducting the emulsion polymerization in the presence of a chain transfer agent.

Mercaptans are normally used as chain transfer agents in emulsion polymerizations. The mercaptans used in commercial applications are typically complex mixtures of hundreds of similar compounds having boiling points within a narrow range. The chain transfer activity of different mercaptans with such mixtures can vary substantially. To further complicate the situation, the distribution of various mercaptans can also vary substantially between lots of material obtained from commercial sources. Thus, consistent molecular weight control is typically difficult to attain in free radical emulsion polymerizations. The use of mercaptans as chain transfer agents also results in odors that workers and customers often find very undesirable.

One of the most important products made by emulsion polymerization is styrene-butadiene rubber. A wide variety of rubber products are made with styrene-butadiene rubber (SBR). For instance, large quantities of SBR are utilized in manufacturing tires for automobiles, trucks, aircraft and other types of vehicles. SBR is commonly used in manufacturing tires because it generally improves traction characteristics.

SBR can be synthesized by utilizing either solution or emulsion polymerization techniques. SBR made by emulsion polymerization (emulsion SBR) generally exhibits better traction characteristics in tire tread compounds. However, SBR made by solution polymerization (solution SBR) typically exhibits much better rolling resistance and treadwear characteristics in tire treads.

In the synthesis of SBR by solution polymerization techniques, an organic solvent is used which is capable of dissolving the monomers (1,3-butadiene and styrene), SBR and the polymerization catalyst or initiator. As the polymerization proceeds, a solution of the SBR in the solvent is produced. This polymer solution is sometimes referred to as a "polymer cement." The SBR is subsequently recovered from the polymer cement and can then be employed as a dry rubber in desired applications; such as, in formulating tire tread rubbers.

Typical emulsion systems employed in the synthesis of SBR contain water, an emulsifier (soap), a free radical generator, styrene monomer, 1,3-butadiene monomer, and optionally a chain transfer agent, such as a mercaptan. For example, in free radical emulsion polymerization systems, radicals can be generated by the decomposition of peroxides or peroxydisulfides.

Commonly employed initiators include t-butyl hydroperoxide, pinane hydroperoxide, para-menthane hydroperoxide, potassium peroxydisulfate ($K_2S_2O_8$), benzoyl peroxide, cumene hydroperoxide and azobisisobutyronitrile (AIBN). These compounds are thermally unstable and decompose at a moderate rate to release free radicals. The combination of potassium peroxydisulfate with a mercaptan such as t-dodecyl mercaptan is commonly used to polymerize butadiene and SBR. In hot recipes, the mercaptan has the dual function of furnishing free radicals through reaction with the peroxydisulfate and also of limiting the molecular weight of polymer by reacting with one growing chain to terminate it and to initiate growth of another chain. This use of mercaptan as a chain transfer agent or modifier is of great commercial importance in the manufacture of SBR in emulsion since it allows control of the toughness of the rubber which otherwise may limit processibility in the factory.

A standard polymerization recipe agreed on for industrial use is known as the "mutual," "standard," "GR-S" or "hot" recipe. This standard polymerization recipe contains the following ingredients (based upon parts by weight): 75.0 parts of 1,3-butadiene, 25 parts of styrene, 0.5 parts of n-dodecyl mercaptan, 0.3 parts of potassium peroxydisulfate, 5.0 parts of soap flakes and 180.0 parts of water.

When this standard recipe is employed in conjunction with a polymerization temperature of 50° C., the rate of conversion to polymer occurs at 5–6 percent per hour. Polymerization is terminated at 70–75 percent conversion since high conversions led to polymers with inferior physical properties, presumably because of crosslinking in the latex particle to form microgel or highly branched structures. This termination is effected by the addition of a "shortstop" such as hydroquinone (about 0.1 part by weight) which reacts rapidly with radicals and oxidizing agents. Thus, the shortstop destroys any remaining initiator and also reacts with polymer-free radicals to prevent formation of new chains. The unreacted monomers are then removed; first, the butadiene by flash distillation at atmospheric pressure, followed by reduced pressure and then the styrene by steam-stripping in a column.

A dispersion of antioxidant is typically added (1.25 parts) to protect the SBR from oxidation. The latex can then be partially coagulated (creamed) by the addition of brine and then fully coagulated with dilute sulfuric acid or aluminum sulfate. The coagulated crumb is then washed, dried and baled for shipment. One of the first major improvements on the basic process was the adoption of continuous processing. In such a continuous process, the styrene, butadiene, soap, initiator and activator (an auxiliary initiating agent) are pumped continuously from storage tanks into and through a series of agitated reactors maintained at the proper temperature at a rate such that the desired degree of conversion is reached at the exit of the last reactor. Shortstop is then added, the latex is warmed by the addition of steam and the unreacted butadiene is flashed off. Excess styrene is then steam-stripped off and the latex is finished, often by blending with oil, creaming, coagulating, drying and bailing. For further details on SBR and the "standard recipe," see The Vanderbilt Rubber Handbook, George G Winspear (Editor), R T Vanderbilt Company, Inc (1968) at pages 34–57.

U.S. Pat. No. 5,583,173 discloses a process for preparing a latex of styrene-butadiene rubber which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber. This process is sometimes referred to as the FIM (feed-injection-monomer) process.

By employing the technique disclosed in U.S. Pat. No. 5,583,173, the amount of soap required to produce styrene-butadiene rubber by emulsion polymerization can be reduced by greater than 30 percent. This is advantageous because it reduces costs and is environmentally attractive. U.S. Pat. No. 5,583,173 also reports that the styrene-butadiene rubber produced by the process described therein offers advantages in that it contains lower quantities of residual soap. This reduces fatty acid bloom characteristics in final products, such as tires, and makes plies easier to adhere together during tire building procedures.

SUMMARY OF THE INVENTION

This invention is based upon the unexpected discovery that dibenzyltrithiocarbonate will act as a pure compound to effectively and consistently control molecular weight in free radical emulsion polymerizations. The polydispersity (ratio of weight average molecular weight to number average molecular weight) of polymers made using dibenzyltrithiocarbonate as a molecular weight regulator is similar to that obtained using conventional mercaptan systems. The use of dibenzyltrithiocarbonate as a molecular weight regulator in emulsion polymerizations offers the advantage of more consistent molecular weight control and a reduced level of undesirable odors.

The present invention more specifically discloses a process for controlling the molecular weight of a polymer synthesized by free radical emulsion polymerization that comprises polymerizing at least one monomer by free radical polymerization in an aqueous emulsion in the presence of dibenzyltrithiocarbonate as a molecular weight regulator.

The present invention further discloses a process for synthesizing styrene-butadiene rubber that comprises copolymerizing styrene monomer and 1,3-butadiene monomer by free radical polymerization in an aqueous emulsion in the presence of dibenzyltrithiocarbonate as a molecular weight regulator.

The present invention also reveals a process for synthesizing styrene-butadiene rubber latex which comprises the steps of (1) charging water, a soap system, a free radical generator, dibenzyltrithiocarbonate, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; and (5) allowing the copolymerization to continue until a monomer conversion of at least about 50 percent is attained to produce the latex of styrene-butadiene rubber.

DETAILED DESCRIPTION OF THE INVENTION

Dibenzyltrithiocarbonate can be used as an agent to control the molecular weight of virtually any polymer made by emulsion polymerization in its presence. The molecular weight reduction of the polymer synthesized increases with increasing levels of the dibenzyltrithiocarbonate. In other words, greater reductions in molecular weight can be attained by using higher levels of dibenzyltrithiocarbonate.

The amount of dibenzyltrithiocarbonate used will typically be within the range of about 0.05 to 1.0 phm. The amount of dibenzyltrithiocarbonate used will more typically be within the range of about 0.20 to 0.30 phm. The amount of dibenzyltrithiocarbonate used will preferably be within the range of about 0.23 to 0.29 phm.

The polymers made utilizing the technique of this invention have a polydispersity of greater than 2.0. The polymers made using the technique of this invention typically have a polydispersity of at least 2.5. The polymers made using the technique of this invention more typically have a polydispersity of at least 3.0.

Conventional emulsion polymerization techniques can be used in the practice of this invention with the polymerization simply being conducted in the presence of the dibenzyltrithiocarbonate. In other words, the dibenzyltrithiocarbonate can be substituted for the chain transfer agents that are conventionally utilized in such emulsion polymerizations. For instance, styrene-butadiene rubber (SBR) can be synthesizing by employing standard free radical emulsion polymerizations techniques with the exception that the polymerization is conducted in the presence of dibenzyltrithiocarbonate.

SBR can be synthesized in accordance with this invention by utilizing the general free radical emulsion polymerization technique described in U.S. Pat. No. 5,583,173 with the polymerization being carried out in the presence of the dibenzyltrithiocarbonate. This polymerization technique is known as the FIM process (feed-injection-monomer The FIM process can be carried out in accordance with this invention by adding styrene monomer, 1,3-butadiene monomer, water, a free radical generator, dibenzyltrithiocarbonate, and a soap system to a first polymerization zone to form an aqueous polymerization medium. The first polymerization zone will normally be a reactor or series of two or more reactors. Copolymerization of the monomers is initiated with the free radical generator. This copolymerization reaction results in the formation of a low conversion polymerization medium.

At the point where the low conversion polymerization medium reaches a monomer conversion which is within the range of about 15 percent to about 40 percent, the low conversion polymerization medium is charged into a second polymerization zone. The second polymerization zone can be a reactor or a series of two or more reactors. In any case, the second polymerization zone is subsequent to the first polymerization zone. The low conversion polymerization medium will normally be charged into the second polymerization zone at a monomer conversion level that is within the range of about 17 percent to about 35 percent. It will more preferably be charged into the second polymerization zone at a level of monomer conversion which is within the range of 20 percent to 30 percent.

Additional styrene monomer and butadiene monomer are charged into the second polymerization zone. Normally, from about 20 percent to about 50 percent of the total amount of styrene monomer and 1,3-butadiene monomer will be charged into the second polymerization zone (from 50 percent to 80 percent of the total monomers are charged into the first polymerization zone). It is normally preferred to charge from about 30 weight percent to about 45 weight percent of the total quantity of monomers charged into the second polymerization zone (from 55 percent to 70 percent of the total monomers charged will be charged into the first polymerization zone). It is generally most preferred to charge from about 35 weight percent to about 42 weight percent of the total quantity of monomers charged into the second polymerization zone (from 58 percent to 65 percent of the total monomers charged will be charged into the first polymerization zone). By splitting the monomer charge between the first polymerization zone and the second polymerization zone, the total quantity of soap required to provide a stable latex is reduced by at least about 30 percent.

The copolymerization in the second polymerization zone is allowed to continue until a monomer conversion of at least 50 percent is attained. The copolymerization will preferably be allowed to continue until a total monomer conversion that is within the range of 50 percent to 68 percent is realized. More preferably, the copolymerization in the second reaction zone will be allowed to continue until a monomer conversion of 58 percent to 65 percent is reached.

In synthesizing the SBR latex, generally from about 1 weight percent to about 50 weight percent styrene and from about 50 weight percent to about 99 weight percent 1,3-butadiene are copolymerized. However, it is contemplated that various other vinyl aromatic monomers can be substituted for the styrene in the SBR. For instance, some representative examples of vinyl aromatic monomers that can be substituted for styrene and copolymerized with 1,3-butadiene in accordance with this invention include 1-vinylnaphtalene, 3-methylstyrene, 3,5-diethylstyrene, 4-propylstyrene, 2,4,6-trimethylstyrene, 4-dodecylstyrene, 3-methyl-5- normal-hexylstyrene, 4-phenylstyrene, 2-ethyl-4-benzylstyrene, 3,5-diphenylstyrene, 2,3,4,5-tetraethylstyrene, 3-ethyl-I -vinylnaphthalene, 6-isopropyl- 1-vinylnaphthalene, 6-cyclohexyl-1-vinylnaphthalene, 7-dodecyl-2-vinylnaphthalene, a-methylstyrene and the like. The SBR will typically contain from about 5 weight percent to about 50 weight percent bound styrene and from about 50 weight percent to about 95 weight percent bound butadiene. It is typically preferred for the SBR to contain from about 20 weight percent to about 30 weight percent styrene and from about 70 weight percent to about 80 weight percent 1,3-butadiene. It is normally most preferred for SBR to contain from about 22 weight percent to about 28 weight percent styrene and from about 72 weight percent to about 78 weight percent 1,3-butadiene. Like ratios of styrene monomer and butadiene monomer will accordingly be charged into the first polymerization zone and the second polymerization zone.

Essentially any type of free radical generator can be used to initiate such free radical emulsion polymerizations. For example, free radical generating chemical compounds, ultra-violet light or radiation can be used. In order to ensure a satisfactory polymerization rate, uniformity and a controllable polymerization, free radical generating chemical agents which are water- or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate, are especially useful in such aqueous emulsion polymerizations.

The amount of initiator employed will vary with the desired molecular weight of the SBR being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. The molecular weight of the SBR produced is, of course, also dependent upon the amount of chain transfer agent, such as t-dodecyl mercaptan, present during the polymerization. For instance, low molecular weight SBR can be synthesized by simply increasing the level of chain transfer agent. As a specific example, in the synthesis of high molecular weight SBR, the amount of t-dodecyl mercaptan used can be within the range of about 0.125 phm to about 0.150 phm. Low molecular weight SBR can be produced by simply increasing the level of t-dodecyl mercaptan present during the polymerization. For instance, the presence of 0.38 phm to 0.40 phm of t-dodecyl mercaptan will typically result in the synthesis of a low molecular weight SBR.

The soap systems used in the FIM emulsion polymerization process typically contain a combination of rosin acid and fatty acid emulsifiers. The weight ratio of fatty acid soaps to rosin acid soaps will be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is charged into the first polymerization zone. The total amount of soap employed will be less than 3.5 phm. The quantity of soap employed will normally be within the range of about 2.5 phm to 3.2 phm. It is typically preferred to utilize a level of soap which is within the range of about 2.6 phm to about 3.0 phm. In most cases, it will be most preferred to use an amount of the soap system that is within the range of about 2.7 phm to 2.9 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature that is within the range of about 35° F. (2° C.) to about 65° F. (18° C.). It is generally preferred for the polymerization to be carried out at a temperature that is within the range of 40° F. (4° C.) to about 60° F. (16° C.). It is typically more preferred to utilize a polymerization temperature that is within the range of about 45° F. (7° C.) to about 55° F. (13° C.). To increase conversion levels, it can be advantageous to increase the temperature as the polymerization proceeds.

After the desired monomer conversion is reached in the second polymerization zone, the SBR latex made is removed from the second polymerization zone and a short stop is added to terminate the copolymerization. The emulsion SBR can then be recovered from the latex by using standard coagulation and drying techniques. SBR made by this process can then be employed in manufacturing tires and a wide variety of other rubber articles.

EXAMPLE 1

In this experiment dibenzyltrithiocarbonate was synthesized by a two step process. In the first step sodium trithiocarbonate was prepared by charging 585 grams of hydrated sodium sulfide (4.5 moles), 1.5 liter of water, 30 grams of a 75% aqueous solution of methyltributylammonium chloride, and 354 grams carbon disulfide (4.6 moles) into a 4 liter flask equipped with a magnetic stirrer and thermometer. Reaction mixture was stirred for 60 minutes during which time it exothermed to 35° C. The solution turned bright red as sodium trithiocarbonate formed.

In the second step dibenzyltrithiocarbonate was prepared by adding 1008 grams of benzyl chloride (8 moles) over a period of 15 minutes to the same reactor containing the sodium trithiocarbonate solution. The reaction mixture exothermed to 50° C. It was stirred for 180 minutes and then heated to 70° C. for 30 additional minutes. To drive the reaction to completion a second catalyst charge containing 15 grams of methyltributylammonium chloride solution was added. The reaction was stirred over night without heating. The water phase was then decanted off. Two liters of ethanol was added to the semi-solid yellow product. The crystalline product was filtered, washed with ethanol and air-dried. A yield of 972 grams (83.6%) was attained. It was determined by GC to have a purity 99.7%. Material prepared by this technique was used in all experiments.

EXAMPLE 2

In this series of experiments 287.4 grams of RO (reverse osmosis) treated water, 0.39 grams of tripotassium phosphate, 44.4 grams of the potassium salt of mixed hydrogenated tallow fatty acid (10% weight solution in water), 3.7 grams of the potassium salt of disproportionated tall oil rosin acid (20% weight solution in water), 0.81 grams of the sodium salt of condensed naphthalene sulfonic acid (47.5% active), 1.02 grams of the sodium salt of linear dodecylbenzenesulfonic acid (23% active), and 0.03 grams of sodium hydrosulfite were added to 750-ml. bottles. Next, 52.7 grams of styrene and 0.53 gms. of tert-dodecyl mercaptan were added for the A bottles. Then, 8.5 grams of RO treated water, 0.03 gm. of sodium ferric ethylenediaminetetraacetate (Hampshire Chemical Co.), and 0.07 gm. of sodium formaldehyde sulfoxylate were added. Finally, 117.3 grams of 1,3-butadiene was added. The bottles were cooled to 55° F. in a tumbling water bath and 0.19 gm. of pinane hydroperoxide (44% active) was added. The same charging procedure was used for the B and C bottles with the exception that 0.34 grams and 0.68 grams of benzyldithiobenzoate, respectively, were used in place of the tert-dodecylmercaptan. For bottle D and bottle E, 0.43 grams and 0.60 grams of dibenzyltrithiocarbonate, respectively, were used in place of the tert-dodecylmercaptan. Duplicate bottles were run for each experiment. The polymerizations were carried out for the specified times. After 4 hours, the original amount of the ferric ethylenediaminetetraacetate, sodium sulfoxylate solution and pinane hydroperoxide were added to Bottles B, C, D, E to increase the polymerization rate. The A bottles were shortstopped after 4.5 hours at 65% conversion with 8.5 grams of RO water, 2.13 grams of sodium dimethyldithiocarbamate (40% active), and 0.10 gm. of diethylhydroxylamine (85% active). All of the other bottles were shortstopped after 9–10 hours at a 65% conversion with the same amount of shortstop. The duplicate bottles of each type were combined and 1000 ml of water being added. The latices were vacuum stripped (22 in. Hg, 120° F.) to remove residual monomers by removing 1000 ml of distillate. To 500 grams of the remaining latex of each, 2.3 grams of 60% Wingstay® C antioxidant emulsion and 3.5 grams of 40% Polygard antioxidant emulsion were added, and the latex was coagulated in 3000 grams of water containing 30 grams of sodium chloride, 3 grams ethyleneamine mixture, and sulfuric acid. The rubber crumb was washed with water and dried in a forced air oven. Data obtained on the rubber crumb is shown in Table I.

TABLE I

| Polymer | Mooney Viscosity (100° C.) | Bound Styrene (FTIR) | GPC | | |
|---|---|---|---|---|---|
| | | | Mw | Mn | Mw/Mn |
| A | 45 | 22.9% | 333,000 | 103,000 | 3.24 |
| B | 155 | 26.0% | | | |
| C | 151 | 23.0% | | | |
| D | 60 | 25.0% | 516,000 | 183,000 | 2.82 |
| E | 30 | 23.1% | 274,000 | 89,000 | 3.08 |

Rubber samples B and C contained some gel.

EXAMPLE 3

To a 10-gallon reactor, 33.9 pounds of RO water (reverse osmosis treated), 20.9 grams of tripotassium phosphate, 5.24 pounds of the potassium salt of mixed hydrogenated tallow fatty acid (10% weight solution in water), 198 grams of the potassium salt of disproportionated tall oil rosin acid (20% weight solution in water), 43.3 grams of the sodium salt of condensed napthalene sulfonic acid (47.5% active), and 54.6 grams of the sodium salt of linear dodecylbenzene sulfonic acid (23% active) were added. The pH of the aqueous solution was adjusted to 10.2–10.8. Next, a solution of 455 grams of RO water, 1.82 grams of sodium ferric ethylenediamine tetraacetate (Hampshire Chemical Co.), and 4.0 grams of sodium formaldehyde sulfoxylate was added. Then, 1747 grams of styrene and 12 grams of tert-dodecylmercaptan were added. Next, 8.19 pounds of 1,3-butadiene was added. The mixture was stirred with two AFT agitator blades at 250 rpm while cooling the contents to 50° F. Next, 10.3 grams pinane hydroperoxide (44% active) was added. When the polymer conversion reached about 30%, 1165 grams of styrene, 8.0 grams of tert-dodecyl mercaptan, and 5.46 pounds of 1,3-butadiene were added. The polymerization was continued at 50° F. until 65% conversion (5.5 hours), and then was shortstopped with a solution of 728 grams of RO water, 2.9 grams potassium hydroxide, 6.83 grams of sodium dimethyldithiocarbamate (40% active), and 3.2 grams of diethylhydroxylamine (85% active). The latex was steam stripped for 3 hours under vacuum at 120° F. latex temperature. A sample of the latex was coagulated using the sodium chloride/sulfuric acid coagulation method described in Example 2. Properties on the dry rubber crumb are shown in Table II.

A second 10-gallon reactor run was made similarly with the following changes. Sodium hydrosulfite (1.82 gms.) was added to the surfactant solution. The activator solution consisted of 455 grams of RO water, 3.64 grams of sodium ferric ethylenediamine tetraacetate, and 8 grams of sodium formaldehyde sulfoxylate. Instead of tert-dodecylmercaptan, 13.65 grams of dibenzyltrithiocarbonate was used. In this experiment, 20.7 grams of pinane hydroperoxide was used. At 30% conversion, 9.1 grams of dibenzyltrithiocarbonate was added in the styrene/butadiene mixture in place of the tert-dodecylmercaptan. At about 33% conversion, a solution of 2.28 grams of RO water, 1.82 grams sodium ferric ethylenediaminetetraacetate, and 4.0 grams of sodium formaldehyde sulfoxylate was added followed by 10.3 grams of pinane hydroperoxide to increase the polymerization rate. Again at about 58% polymer conversion, a solution of 152 grams of RO water, 1.2 grams sodium ferric ethylenediaminetetraacetate, and 2.67 grams of sodium formaldehyde sulfoxylate was added along with 6.9 grams of pinane hydroperoxide. The polymerization was shortstopped after 10.5 hours at 65% conversion using the same amount of shortstopping agents as in the prior 10-gallon run. Table II lists some of the properties of the resulting two styrene/butadiene rubbers.

TABLE II

10-Gallon Reactor - SBR Rubbers

| Polymer Modifier | Mooney Viscosity (100° C.) | Bound Styrene FTIR | GPC Mw | Mn | Mw/Mn |
|---|---|---|---|---|---|
| tert-dodecyl mercaptan | 45 | 22.6% | 318,000 | 110,000 | 2.89 |
| Dibenzyltrithio-Carbonate | 43 | 23.5% | 339,000 | 135,000 | 2.51 |

EXAMPLE 4

In this series of experiments, 282 grams of RO treated water, 0.30 grams of Tamol SN surfactant, 0.75 grams of tripotassium phosphate, 19.6 grams of the potassium salt of disproportioned tall oil rosin acid (20% weight solution in water), 35.7 grams of the sodium salt of mixed hydrogenated tallow fatty acid (10% weight solution in water), and 0.03 grams of sodium hydrosulfite were added to 750-ml bottles. Then, 8.5 grams. of RO treated water, 0.03 grams of sodium ferric ethylenediaminetetraacetate (Hampshire Chemical Co.), and 0.07 grams of sodium formaldehyde sulfoxylate were added to the bottles. Next, 52.7 grams of styrene and 0.53 grams of tert-dodecylmercaptan were added for the A bottles. Finally, 117.3 grams of 1,3-butadiene was added. The bottles and contents were cooled to 50° F., and 0.19 gm. of pinane hydroperoxide (44% active) was added. The same charging procedure was used for the B and C bottles except 0.43 grams and 0.60 grams of 1-phenylethyldithiobenzoate, respectively, were used in place of tert-dodecylmercaptan. Also, the activator solution was changed to 8.5 grams of RO treated water, 0.07 grams of sodium ferric ethylenediaminetetraacetate, and 0.15 grams of sodium formaldehyde sulfoxylate and the initiator to 0.39 grams of pinane hydroperoxide (44% active). Duplicate bottles were run for each. The polymerizations were carried out for the specified times. After 4 hours. and 65% polymer conversion, the A bottles were shortstopped with a mixture of 8.5 grams RO water, 2.13 grams of sodium dimethyldithiocarbamate (40% active), and 0.10 grams diethylhydroxylamine (85% active). The B bottles were shortstopped after 7 hours at 65% conversion and the C bottles after 9.75 hours at 65% conversion. The latices were vacuum stripped, coagulated, and dried to crumb rubbers according to the procedure described in Example 2. Data on the crumb rubbers is shown in Table III.

TABLE III

Data on SBR Rubbers

| Polymer | Mooney Viscosity (100° C.) |
|---|---|
| A | 30 |
| B | 153 |
| C | 149 |

While certain representative embodiments and details have been shown for the purpose of illustrating the subject invention, it will be apparent to those skilled in this art that various changes and modifications can be made therein without departing from the scope of the subject invention.

What is claimed is:

1. A process for synthesizing styrene-butadiene rubber latex which comprises the steps of (1) charging water, a soap systemn, a free radical generator, dibenzyltrithiocarbonate, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; and (5) allowing the copolymerization to continue until a monomer conversion of at least about 50 percent is attained to produce the latex of styrene-butadiene rubber.

2. A process for controlling the molecular weight of a polymer synthesized by free radical emulsion polymerization that comprises polymerizing at least one monomer by free radical polymerization in an aqueous emulsion in the presence of dibenzyltrithiocarbonate as a molecular weight regulator, wherein the polymer has a polydispersity of at least 2.0.

3. A process as specified in claim 2 wherein the polymer has a polydispersity of at least 2.5.

4. A process as specified in claim 2 wherein the polymer has a polydispersity of at least 3.0.

5. A process for synthesizing styrene-butadiene rubber that comprises copolymerizing styrene monomer and 1,3-butadiene monomer by free radical polymerization in an aqueous emulsion in the presence of a free radical initiator and dibenzyltrithiocarbonate as a molecular weight regulator, wherein the 1,3-butadiene is present at a level of 50 phm to about 95 phm and wherein the styrene is present at a level of 5 phm to about 50 phm.

6. A process for synthesizing styrene-butadiene rubber as specified in claim 5 wherein the styrene is present at a level of 20 phm to about 30 phm and wherein the 1,3 -butadiene is present at a level of 70 phm to about 80 phm.

7. A process for synthesizing styrene-butadiene rubber as specified in claim 5 wherein the styrene is present at a level of 22 phm to about 28 phm and wherein the 1,3-butadiene is present at a level of 72 phm to about 78 phm.

8. A process for synthesizing styrene-butadiene rubber as specified in claim 5 wherein the styrene-butadiene rubber has a polydispersity of at least 2.0.

9. A process for synthesizing styrene-butadiene rubber as specified in claim 6 wherein the styrene-butadiene rubber has a polydispersity of at least 2.5.

10. A process for synthesizing styrene-butadiene rubber as specified in claim 7 wherein the styrene-butadiene rubber has a polydispersity of at least 3.0.

11. A process for synthesizing styrene-butadiene rubber as specified in claim 8 wherein the amount of the dibenzyltrithiocarbonate is within the range of 0.05 phm to 1 phm.

12. A process for synthesizing styrene-butadiene rubber as specified in claim 9 wherein the amount of the dibenzyltrithiocarbonate is within the range of 0.20 phm to 0.30 phm.

13. A process for synthesizing styrene-butadiene rubber as specified in claim 10 wherein the amount of the dibenzyltrithiocarbonate is within the range of 0.23 phm to about 0.29 phm.

14. A process as specified in claim 11 wherein the process is conducted at a temperature which is within the range of about 35° F. to about 65° F.

15. A process as specified in claim 12 wherein the process is conducted at a temperature which is within the range of about 40° F. to about 65° F.

16. A process as specified in claim 13 wherein the process is conducted at a temperature which is within the range of about 45° F. to about 55 ° F.

17. A process as specified in claim 2 wherein the amount of the dibenzyltrithiocarbonate is within the range of 0.05 phm to about 1 phm.

18. A process as specified in claim 3 wherein the amount of the dibenzyltrithiocarbonate is within the range of 0.20 phm to about 0.30 phm.

19. A process as specified in claim 4 wherein the amount of the dibenzyltrithiocarbonate is within the range of 0.23 phm to about 0.29 phm.

* * * * *